United States Patent
Hsu et al.

(10) Patent No.: US 10,670,954 B2
(45) Date of Patent: Jun. 2, 2020

(54) PROJECTOR, ILLUMINATON SYSTEM AND DIFFUSION ELEMENT

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/354,179

(22) Filed: Mar. 15, 2019

(65) Prior Publication Data
US 2019/0353997 A1 Nov. 21, 2019

(30) Foreign Application Priority Data
May 16, 2018 (CN) ............. 2018 2 0724352 U

(51) Int. Cl.
*G03B 21/20* (2006.01)
*G02B 5/02* (2006.01)
(Continued)

(52) U.S. Cl.
CPC ......... *G03B 21/208* (2013.01); *G02B 5/0205* (2013.01); *G02B 5/0278* (2013.01);
(Continued)

(58) Field of Classification Search
CPC ............ G03B 21/145; G03B 21/208; G03B 21/2013; G03B 21/2033; G03B 21/2053;
(Continued)

(56) References Cited

U.S. PATENT DOCUMENTS

2011/0075108 A1* 3/2011 Kojima ............... G03B 21/20
353/38
2014/0022762 A1* 1/2014 Zheng ............... G02B 5/0278
362/97.1
(Continued)

FOREIGN PATENT DOCUMENTS

CN 102650814 8/2012
CN 103792635 5/2014
(Continued)

OTHER PUBLICATIONS

"Office Action of Taiwan Counterpart Application," dated Mar. 7, 2019, p. 1-p. 9.

*Primary Examiner* — Sultan Chowdhury
(74) *Attorney, Agent, or Firm* — JCIPRNET

(57) ABSTRACT

A projector including an illumination system, a light valve and a projection lens is provided. The illumination system is configured to provide an illumination beam, and includes a light source and a diffusion element. The light source is configured to provide an exciting beam. The diffusion element is located on a transmission path of the exciting beam, and configured to receive the exciting beam for outputting at least part of the illumination beam. The diffusion element includes at least one first diffusion region and at least one second diffusion region surrounding the first diffusion region. A haze of the first diffusion region is greater than a haze of the second diffusion region. The light valve is located on a transmission path of the illumination beam, and configured to convert the illumination beam into an image beam. The projection lens is located on a transmission path of the image beam.

26 Claims, 5 Drawing Sheets

(51) Int. Cl.
  *G02B 26/00*  (2006.01)
  *H04N 9/31*  (2006.01)
(52) U.S. Cl.
  CPC ....... *G02B 26/008* (2013.01); *G03B 21/2033* (2013.01); *H04N 9/3161* (2013.01)
(58) Field of Classification Search
  CPC ...... G02B 5/02; G02B 5/0205; G02B 5/0215; G02B 5/0231; G02B 5/0242; G02B 5/0252; G02B 5/0257; G02B 5/0263; G02B 5/0278
  See application file for complete search history.

(56) References Cited

U.S. PATENT DOCUMENTS

2014/0118991 A1* 5/2014 Lin ...................... G02B 26/008
                                                                362/84
2018/0279454 A1* 9/2018 Takeshita ............. G03B 21/145
2018/0348512 A1* 12/2018 Chiba ................... B60K 35/00

FOREIGN PATENT DOCUMENTS

| | | |
|---|---|---|
| CN | 103796235 | 5/2014 |
| TW | 201333380 | 8/2013 |
| TW | 201423158 | 6/2014 |

* cited by examiner

PROJECTOR, ILLUMINATON SYSTEM AND DIFFUSION ELEMENT

CROSS-REFERENCE TO RELATED APPLICATION

This application claims the priority benefit of China application serial no. 201820724352.5, filed on May 16, 2018. The entirety of the above-mentioned patent application is hereby incorporated by reference herein and made a part of this specification.

BACKGROUND OF THE INVENTION

1. Field of the Invention

The invention relates to an optical device and components thereof, and more particularly, to a projector, an illumination system and a diffusion element.

2. Description of Related Art

A projector is a display device for generating large size images. During the imaging process of a projector, an illumination beam generated by a light source is first converted into an image beam by a light valve, and then the image beam can be projected onto a screen or a wall surface by using a projection lens.

In general, the main purpose of atomizing a laser beam emitted by a laser light source by a diffusion element in the projector is to eliminate a central light spot of the laser beam and prevent energy of the laser beam from being excessively concentrated, so as to avoid burnt and deterioration phenomenon at a center position of a phosphor adhesive of a phosphor wheel or other devices in the subsequent process, so as to improve reliability of the projector. However, if a haze of the diffusion element is too high, its light transmittance would be reduced and such the light intensity at a non-center region of the laser beam would not be sufficient, thereby affecting light utilization of the projector. Therefore, how to provide sufficient light intensity at the non-center region of the laser beam while effectively eliminating the central light spot of the laser beam is an important topic in the design of the diffusion element.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projector, an illumination system and a diffusion element, which are capable of providing sufficient light intensity while preventing energy of exciting beam from being excessively concentrated.

The invention provides a projector, an illumination system and a diffusion element, which are capable of improving diffusion effect for light beams and reducing manufacturing cost.

Other objectives and advantages of the invention can be further illustrated by the technical features broadly embodied and described as follows.

To achieve one, a part, or all of the above objectives or other objectives, an embodiment of the invention proposes a projector, which includes an illumination system, a light valve and a projection lens. The illumination system is configured to provide an illumination beam, and includes a light source and a diffusion element. The light source is configured to provide an exciting beam. The diffusion element is located on a transmission path of at least part of the exciting beam, and configured to receive the at least part of the exciting beam for outputting at least part of the illumination beam. The diffusion element includes at least one first diffusion region and at least one second diffusion region. The at least one second diffusion region surrounds the at least one first diffusion region. A haze of the at least one first diffusion region is greater than a haze of the at least one second diffusion region. The light valve is located on a transmission path of the illumination beam from the illumination system, and configured to convert the illumination beam from the illumination system into an image beam. The projection lens is located on a transmission path of the image beam.

To achieve one, a part, or all of the above objectives or other objectives, an embodiment of the invention proposes an illumination system, which includes a light source and a diffusion element. The light source is configured to provide an exciting beam. The diffusion element is located on a transmission path of at least part of the exciting beam. The diffusion element includes at least one first diffusion region and at least one second diffusion region. The at least one second diffusion region surrounds the at least one first diffusion region. A haze of the at least one first diffusion region is greater than a haze of the at least one second diffusion region.

To achieve one, a part, or all of the above objectives or other objectives, an embodiment of the invention proposes a diffusion element, which includes at least one first diffusion region and at least one second diffusion region. The at least one second diffusion region surrounds the at least one first diffusion region. Here, a haze of the at least one first diffusion region is greater than a haze of the at least one second diffusion region.

To achieve one, a part, or all of the above objectives or other objectives, an embodiment of the invention proposes another projector, which includes an illumination system, a light valve and a projection lens. The illumination system is configured to provide an illumination beam, and includes a light source and a diffusion element. The light source is configured to provide an exciting beam. The diffusion element is located on a transmission path of at least part of the exciting beam, configured to receive the at least part of the exciting beam for outputting at least part of the illumination beam. A plurality of diffusion structures are disposed on the diffusion element and the diffusion element has a light incident surface and a light emitting surface opposite to each other. The diffusion structures located on the light incident surface and the light emitting surface are uniformly distributed. The light valve is located on a transmission path of the illumination beam from the illumination system, and configured to convert the illumination beam from the illumination system into an image beam. The projection lens is located on a transmission path of the image beam.

To achieve one, a part, or all of the above objectives or other objectives, an embodiment of the invention proposes another illumination system, which includes a light source and a diffusion element. The light source is configured to provide an exciting beam. The diffusion element is located on a transmission path of at least part of the exciting beam, and a plurality of diffusion structures are disposed on the diffusion element and the diffusion element has a light incident surface and a light emitting surface opposite to each other. The diffusion structures located on the light incident surface and the light emitting surface are uniformly distributed.

To achieve one, a part, or all of the above objectives or other objectives, an embodiment of the invention proposes another diffusion element, which includes a plurality of diffusion structures, a light incident surface and a light emitting surface. The light emitting surface is opposite to the light incident surface. The diffusion structures located on the light incident surface and the light emitting surface are uniformly distributed.

Based on the above, the embodiments of the invention have at least one of the following advantages and effects. In the embodiments of the invention, the diffusion element may be divided into the first diffusion region and the second diffusion region surrounding the first diffusion region, and the haze of the first diffusion region is greater than the haze of the second diffusion region (i.e., the diffusion element may have multiple diffusion regions with different hazes). Accordingly, by using the high haze of the first diffusion region, the central light spot of the exciting beam may be effectively eliminated, and energy of the exciting beam may be prevented from being excessively concentrated, and by using the low haze of the second diffusion region, sufficient light intensity may also be provided at the non-center region, so that the projector can have favorable light uniformity, reliability and light utilization. In the embodiments of the invention, multiple diffusion structures may be uniformly distributed on both the light incident surface and the light emitting surface of the diffusion elements. Accordingly, diffusion effect may be improved for light beams and manufacturing cost may be reduced.

Other objectives, features and advantages of the invention will be further understood from the further technological features disclosed by the embodiments of the invention. Drawings are used to show and describe preferred embodiments of this invention simply by way of illustration of modes which are best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
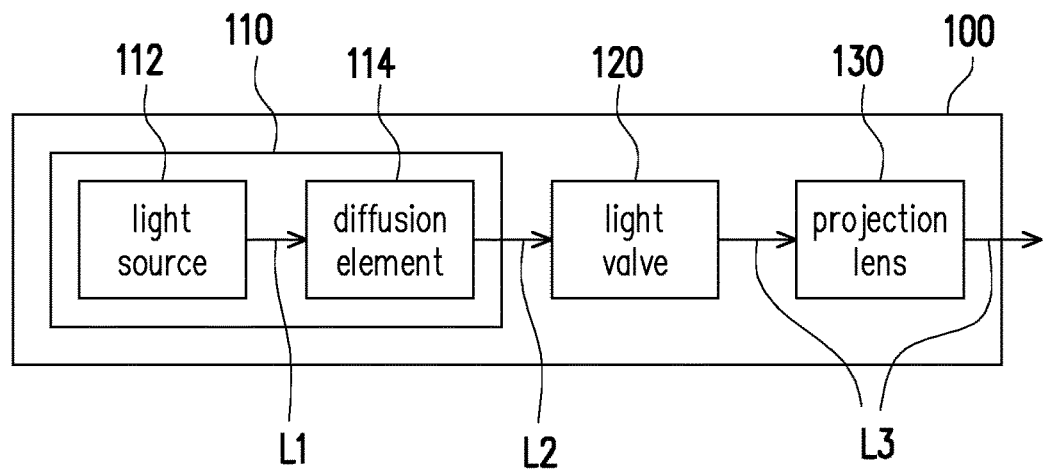
FIG. 1 is a schematic diagram of a projector in an embodiment of the invention.

FIG. 1 is a schematic diagram of a projector in an embodiment of the invention. With reference to FIG. 1, a projector 100 of the embodiment includes an illumination system 110, a light valve 120 and a projection lens 130. The illumination system 110 is configured to provide an illumination beam L2. The light valve 120 is located on a transmission path of the illumination beam L2 from the illumination system 110 and configured to convert the illumination beam L2 from the illumination system 110 into an image beam L3. The projection lens 130 is located on a transmission path of the image beam L3 and configured to project the image beam L3 outside the projector 100. The light valve 120 may include DMD (Digital Micro-mirror Device), LCoS (Liquid Crystal on Silicon) or LCD panel (Liquid Crystal Display Panel), but the invention is not limited thereto.

In this embodiment, the illumination system 110 includes a light source 112 and a diffusion element 114. The light source 112 is, for example, a laser light source configured to provide an exciting beam L1, but the invention is not limited thereto. In other embodiments, the light source 112 may also be a light emitting diode light source, but the invention is not limited thereto. The diffusion element 114 is located on a transmission path of at least part of the exciting beam L1, and configured to receive the at least part of the exciting beam L1 for outputting at least part of the illumination beam L2. Specifically, in an embodiment, the diffusion element 114 may be disposed in a projector without a phosphor wheel, and the illumination beam L2 is formed by the exciting beam L1, which is diffused by the diffusion element 114 without necessarily being excited by the phosphor wheel. Further, in an embodiment, the diffusion element 114 may be disposed in a projector with a phosphor wheel, in which a part of the exciting beam L1 may be diffused by the diffusion element 114 and become a part of the illumination beam L2. Another part of the exciting beam L1 may be converted into another part of the illumination beam L2 by the phosphor wheel by using a wavelength conversion.

Figure 2:
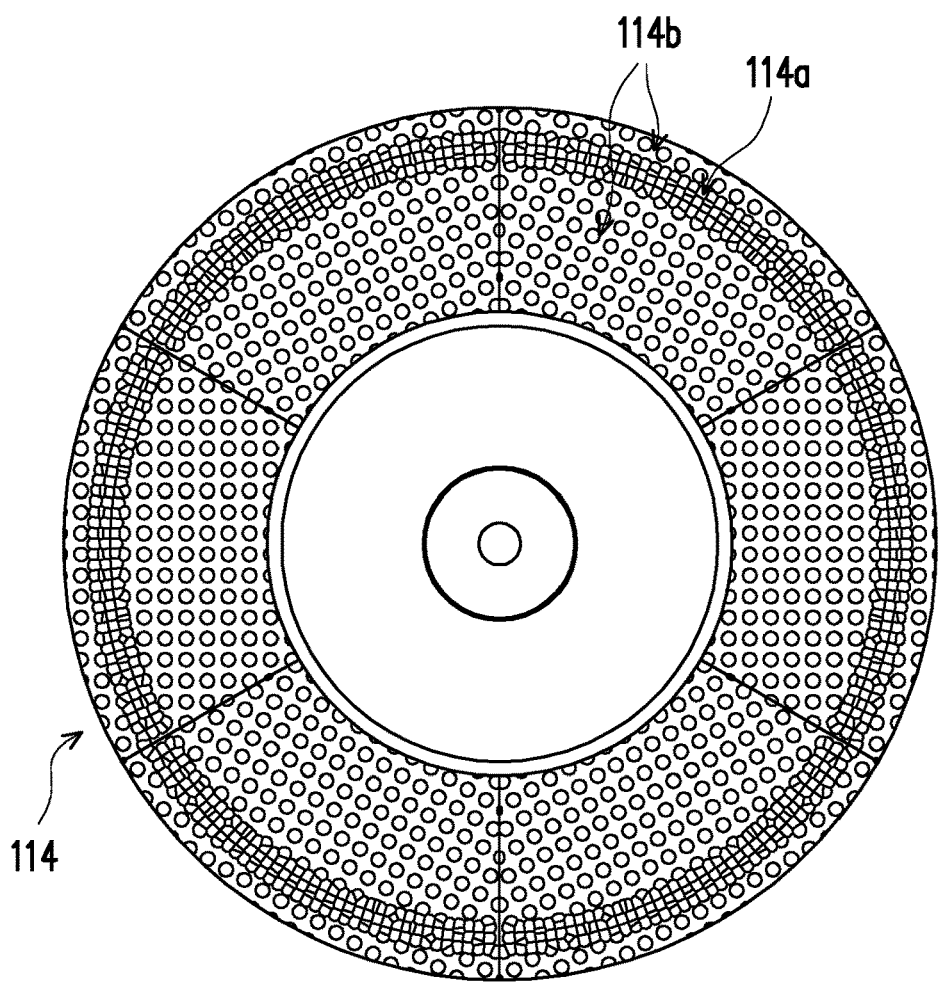
FIG. 2 is a front view of the diffusion element in FIG. 1.

FIG. 2 is a front view of the diffusion element in FIG. 1. With reference to FIG. 2, the diffusion element 114 of the embodiment is, for example, a diffuser wheel and is rotatable, so as to prevent an area of the diffusion element 114 from being continuously illuminated by the exciting beam L1 and to prevent that area from being overheated. The diffusion element 114 includes a first diffusion region 114a and a second diffusion region 114b. The second diffusion region 114b surrounds the first diffusion region 114a. An optical axis of the illumination beam L2 (shown in FIG. 1) passes through the first diffusion region 114a. A haze of the first diffusion region 114a is greater than a haze of the second diffusion region 114b. For instance, in an embodiment, the haze of the first diffusion region 114a is, for example, 20 to 30, and thus a diffusion angle of the first diffusion region 114a is approximately 2.2 degree. In an embodiment, the haze of the second diffusion region 114b is, for example, 10 to 20, and thus a diffusion angle of the second diffusion region 114b is approximately 1.8 degree.

By dividing the diffusion element 114 into the first diffusion region 114a and the second diffusion region 114b surrounding the first diffusion region 114b and by the configuration that the haze of the first diffusion region 114a is greater than the second diffusion region 114b as described above, the central light spot of the exciting beam L1 may be effectively eliminated and energy of the exciting beam L1 may be prevented from being excessively concentrated, because the center region of the exciting beam L1 is corresponding to the first diffusion region 114a with a high haze. Sufficient light intensity may be provided because the non-center region of the exciting beam L1 is corresponding to the second diffusion region 114b with a low haze. Accordingly, a projection image provided by the projector 100 can have favorable light uniformity, reliability and light utilization.

Figure 3:
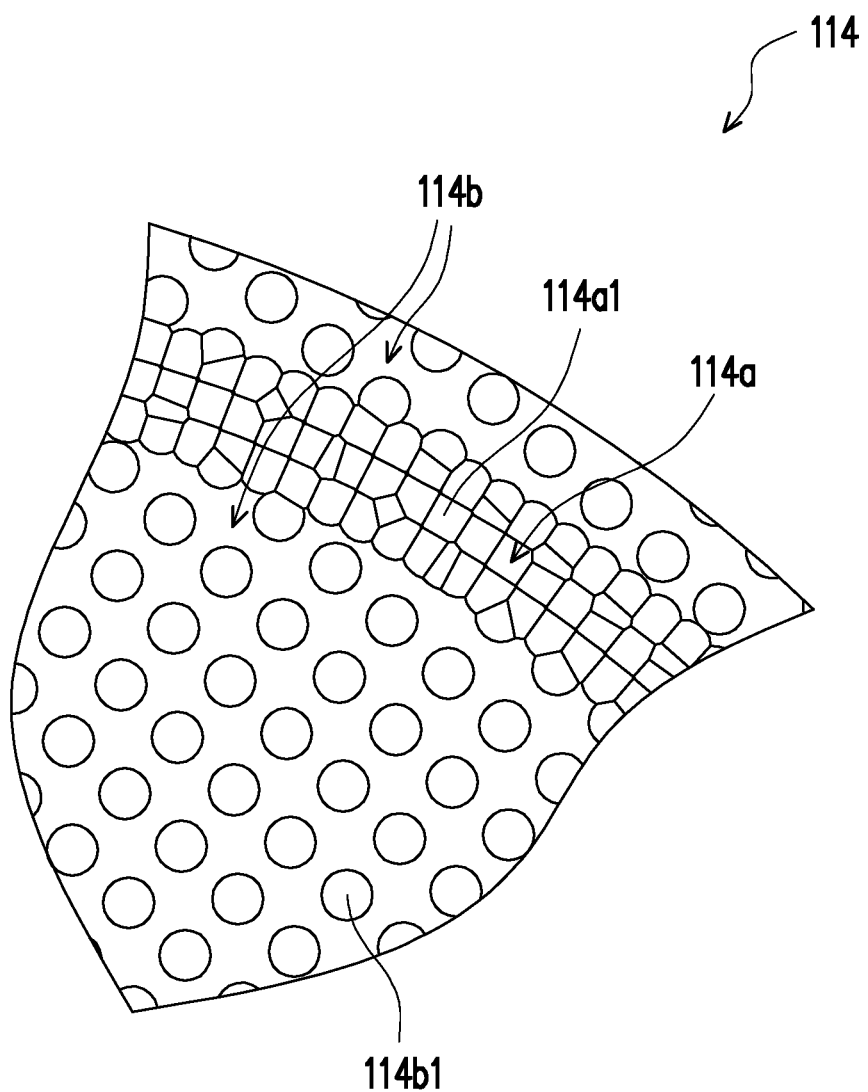
FIG. 3 is a partial enlarged view of the diffusion element in FIG. 2.

FIG. 3 is a partial enlarged view of the diffusion element in FIG. 2. With reference to FIG. 3, in this embodiment, a plurality of first diffusion structures 114a1 are disposed in the first diffusion region 114a, and a plurality of second diffusion structures 114b1 are disposed in the second diffusion region 114b. In this embodiment, an arrangement density of the first diffusion structures 114a1 is greater than an arrangement density of the second diffusion structures 114b1 such that the haze of the first diffusion region 114a is greater than the haze of the second diffusion region 114b. In an embodiment, the configuration that the haze of the first diffusion region 114a is greater than the haze of the second diffusion region 114b may also be achieved by, for example, making a size of each of the first diffusion structures 114a1 less than a size of each of the second diffusion structures 114b1, but the invention is not limited thereto.

Figure 4:
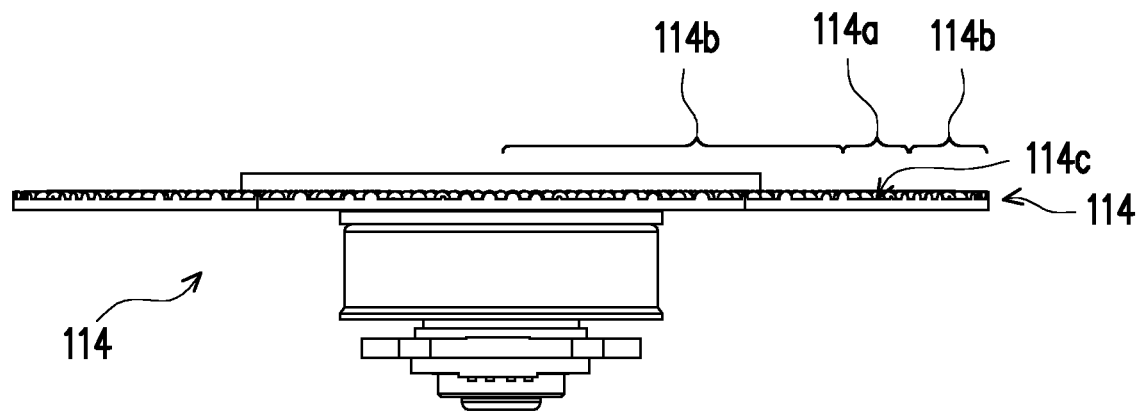
FIG. 4 is a side view of the diffusion element in FIG. 1.
Figure 5:
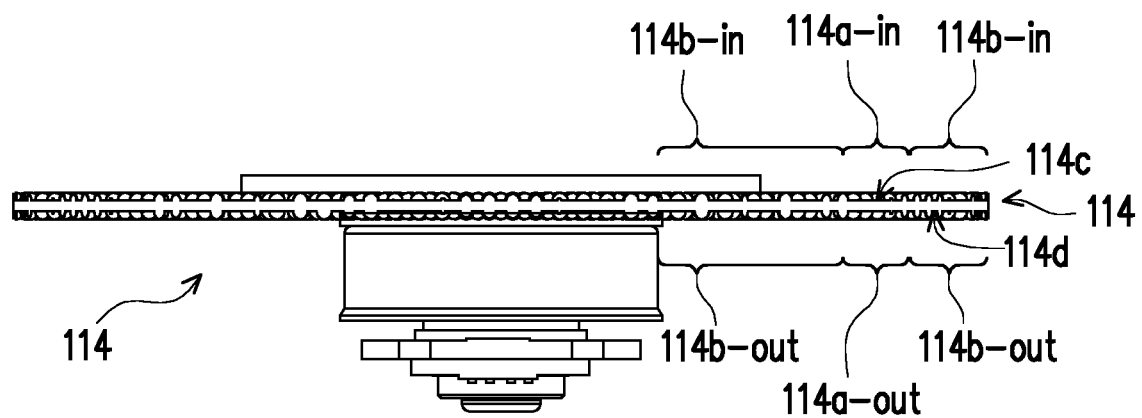
FIG. 5 is a side view of the diffusion element in another embodiment of the invention.

FIG. 4 is a side view of the diffusion element in FIG. 1. With reference to FIG. 4, in this embodiment, the diffusion element 114 has a light incident surface 114c, and the first diffusion region 114a and the second diffusion region 114b are both located on the light incident surface 114c. However, the invention is not such limited. Details regarding the above are described below with reference to the drawings. FIG. 5 is a side view of the diffusion element in another embodiment of the invention. The major difference between the embodiment depicted in FIG. 4 and the embodiment depicted in FIG. 5 is described as follows. The diffusion element 114 has a light incident surface 114c and a light emitting surface 114d opposite to each other. Two first diffusion regions 114a-in and 114a-out are respectively located on the light incident surface 114c and a light emitting surface 114d and aligned with each other. Two second diffusion regions 114b-in and 114b-out in an inner ring are respectively located on the light incident surface 114c and the light emitting surface 114d and aligned with each other. Two second diffusion regions 114b-in and 114b-out in an outer ring are respectively located on the light incident surface 114c and the light emitting surface 114d and aligned with each other. In this way, even if the exciting beam L1 (shown in FIG. 1) incident to a boundary between the adjacent diffusion structures of the light incident surface 114c is not effectively atomized on the light incident surface 114c, the exciting beam L1 can still be effectively atomized by the diffusion structures on the light emitting surface 114d. In brief, the first diffusion regions (114a-in/114a-out) and the second diffusion regions (114b-in/114b-out) are disposed on both the light incident surface 114c and the light emitting surface 114d to form a diffusion element 114 with both sides atomized, which can help to improve diffusion effect for light beams. In addition, in an embodiment, a thickness of the first diffusion region 114a-in/114a-out in FIG. 5 is, for example, less than a thickness of the first diffusion region 114a in FIG. 4, and a thickness of the second diffusion region 114b-in/114b-out in FIG. 5 is, for example, less than a thickness of the second diffusion region 114b in FIG. 4. However, the invention is not such limited. In an embodiment, manufacturing cost may be reduced by reducing the thickness of the first diffusion region 114a-in/114a-out and the thickness of the second diffusion region 114b-in/114b-out. Furthermore, in other embodiments not illustrated, the diffusion structures on the light incident surface of the diffusion element with both sides atomized are uniformly distributed to provide a haze value of a fixed value. For example, the diffusion structures on the light emitting surface of the diffusion element with both sides atomized are uniformly distributed to provide a haze value of said fixed value. That is to say, the haze value of the first diffusion region 114a-in (or 114a-out) is equal to the haze value of the second diffusion region 114b-in (or 114b-out) in the diffusion element with both sides atomized in other embodiments. From another perspective, it is also possible that the first diffusion region and the second diffusion region are not divided as described in the foregoing embodiments in the diffusion element with both sides atomized in other embodiments. In some embodiments, a haze value of the diffusion structures uniformly distributed on the light incident surface of the diffusion element with both sides atomized and a haze value of the diffusion structures uniformly distributed on the light emitting surface are identical or different, for example. In general, the diffusion element with both sides atomized can achieve effects like improved light transmittance, improved accuracy on a haze of light beam (a light diffusion angle) and uniformity of the light diffusion angle. In the embodiment of FIG. 4 described above, the diffusion element 114 may be a transmissive diffuser wheel or a reflective diffuser wheel. In the embodiments of FIG. 4 and FIG. 5 described above, a driving device (e.g., a motor) for driving the diffusion element 114 is, for example, located oppositely to the light incident surface 114c or on the light emitting surface 114d, but the invention is not limited thereto.

Figure 6:
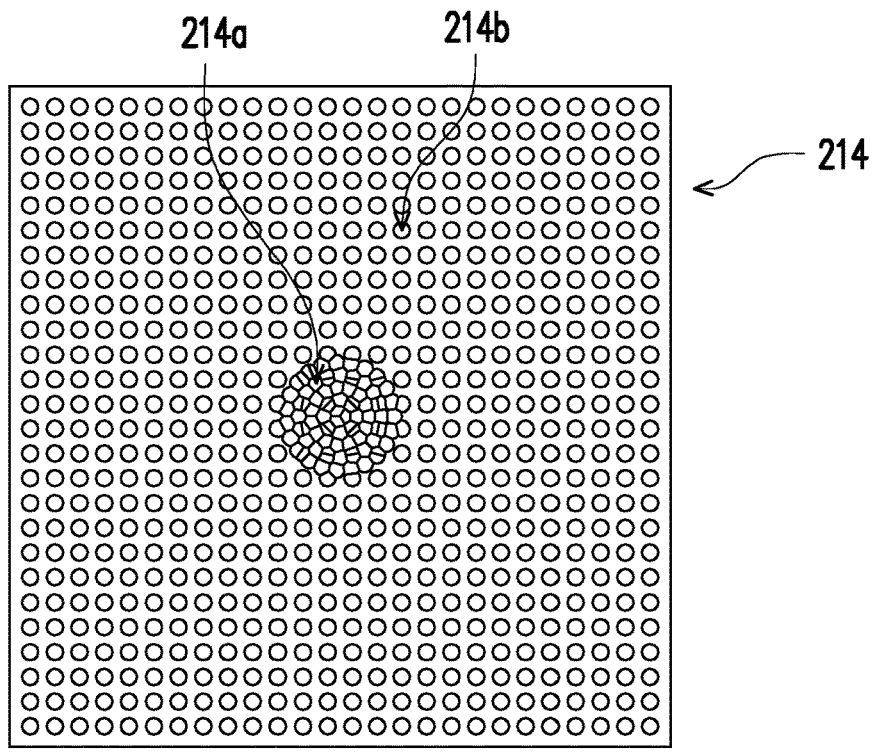
FIG. 6 is a front view of the diffusion element in another embodiment of the invention.

FIG. 6 is a front view of the diffusion element in another embodiment of the invention. In a diffusion element 214 depicted in FIG. 6, a second diffusion region 214b surrounds a first diffusion region 214a. Nonetheless, configurations and effects of the first diffusion region 214a and the second diffusion region 214b are similar to configurations and effects of the first diffusion region 114a and the second diffusion region 114b depicted in FIG. 2, which are not repeated hereinafter. The major difference between the diffusion element 214 and the diffusion element 114 is that, the diffusion element 214 in FIG. 6 is a stationary diffuser sheet, which is different from the diffuser wheel (diffusion element 114) in FIG. 2. That is to say, the diffusion element 214 in FIG. 6 is configured to serve as a static diffuser sheet, and the diffusion element 114 in FIG. 2 is configured to serve as a dynamic diffuser wheel. In this embodiment, first diffusion structures in the first diffusion region 214a are uniformly distributed, so that a haze value of the first diffusion region 214a is a fixed value. For example, second diffusion structures in the second diffusion region 214b are uniformly distributed, so that a haze value of the second diffusion region 214b is a fixed value. However, the invention is not such limited. In addition, in other embodiments not illustrated, the diffusion element with both sides atomized may also be a stationary (static) diffuser sheet.

Figure 7:
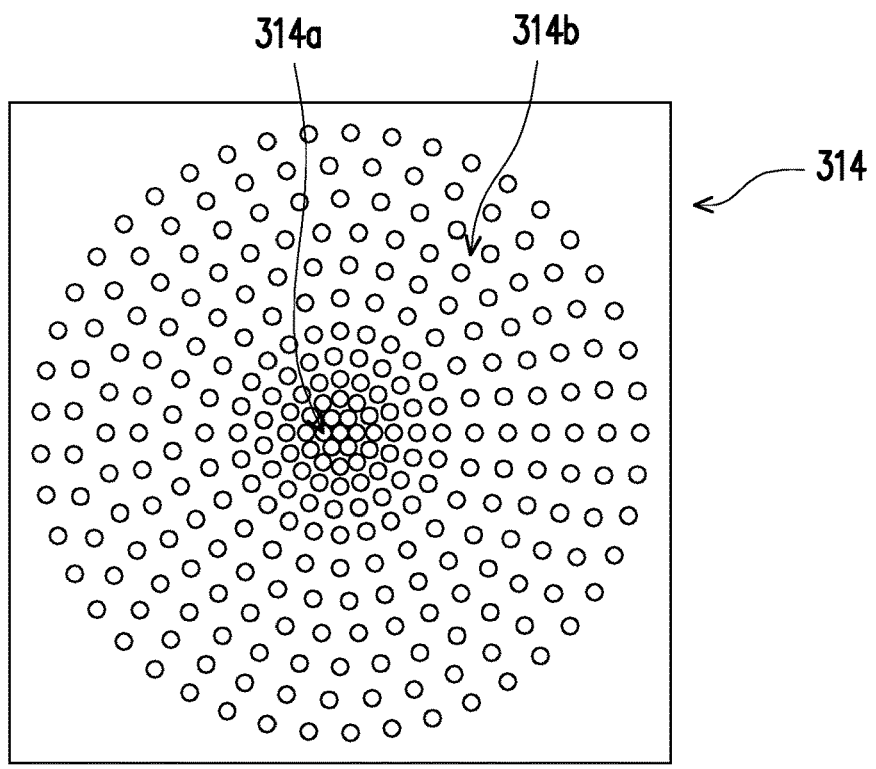
FIG. 7 is a front view of the diffusion element in another embodiment of the invention.

FIG. 7 is a front view of the diffusion element in another embodiment of the invention. In a diffusion element 314 depicted in FIG. 7, configurations and effects of a first diffusion region 314a and a second diffusion region 314b are similar to the configurations and the effects of the first diffusion region 214a and the second diffusion region 214b depicted in FIG. 6, which are not repeated hereinafter. The major difference between the diffusion element 314 and the diffusion element 214 is that, the haze of the diffusion element 314 is gradually decreased from the first diffusion region 314a to the second diffusion region 314b. In this embodiment, the haze of the first diffusion region 314a is, for example, gradually decreased from a center of the first diffusion region 314a to the second diffusion region 314b, and the haze of the second diffusion region 314b is, for example, gradually decreased from a periphery of the first diffusion region 314a to a periphery of the second diffusion region 314b. However, in other embodiments, the first diffusion region 314a with the haze gradually decreased from the center to the periphery and the second diffusion region 314b in FIG. 7 may also be disposed on a dynamic diffuser wheel.

Figure 8:
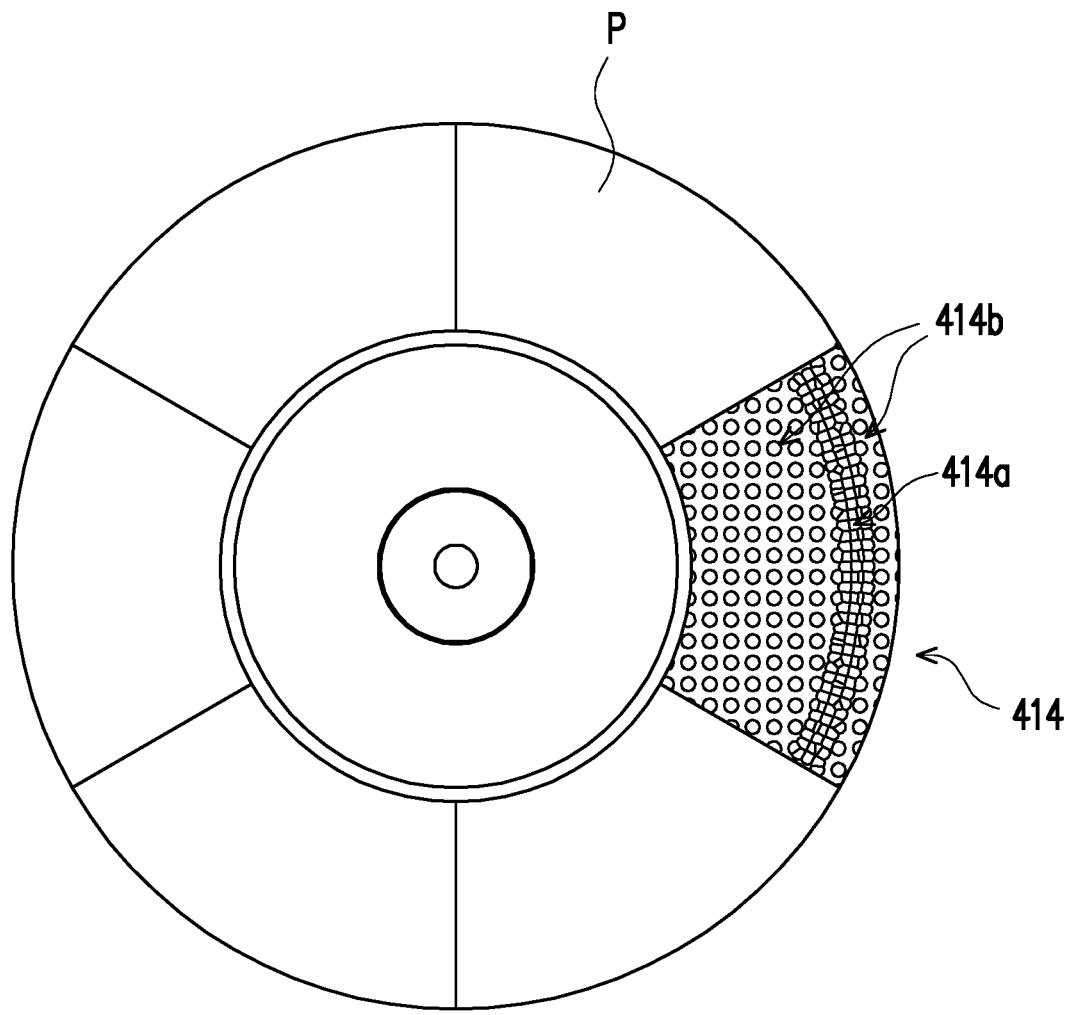
FIG. 8 is a front view of the diffusion element in another embodiment of the invention.

FIG. 8 is a front view of the diffusion element in another embodiment of the invention. In a diffusion element 414 depicted in FIG. 8, configurations and effects of a first diffusion region 414a and a second diffusion region 414b are similar to the configurations and the effects of the first diffusion region 114a and the second diffusion region 114b depicted in FIG. 2, which are not repeated hereinafter. The major difference between the diffusion element 414 and the diffusion element 114 is that, the diffusion element 414 is a rotatable wheel formed by integrating the diffuser wheel and the phosphor wheel, and includes a diffusion region composed of a phosphor region P, the first diffusion region 414a and the second diffusion region 414b. With the rotation of the rotatable wheel, the phosphor region P and the diffusion regions (the first diffusion region 414a and the second diffusion region 414b) can be sequentially moved into a transmission path of the exciting beam L1 (shown in FIG. 1).

In the foregoing embodiments, the diffusion structures in the diffusion element may be manufactured by etching, sandblasting, grinding, or other atomization methods with appropriate tools, but the invention is not limited thereto.

In summary, the embodiments of the invention have at least one of the following advantages and effects. In the embodiments of the invention, the diffusion element may be divided into the first diffusion region and the second diffusion region surrounding the first diffusion region, and the haze of the first diffusion region is greater than the haze of the second diffusion region (i.e., the diffusion element may have multiple diffusion regions with different hazes). Accordingly, by using the high haze of the first diffusion region, the central light spot of the exciting beam may be effectively eliminated, and energy of the exciting beam may be prevented from being excessively concentrated, and by using the low haze of the second diffusion region, sufficient light intensity may also be provided at the non-center region, so that the projector can have favorable light uniformity, reliability and light utilization In the embodiments of the invention, multiple diffusion structures may be uniformly distributed on both the light incident surface and the light emitting surface of the diffusion elements. Accordingly, diffusion effect may be improved for light beams and manufacturing cost may be reduced. In general, the embodiments of the invention may be used to improve optical-mechanical design flexibility for the projector. In an embodiment of the invention, when the diffusion element according to that embodiment is applied to a projector with a phosphor wheel and a filter wheel, design flexibility may be further improved for the diffusion element (the dynamic diffuser wheel or the static diffuser sheet), the phosphor wheel, and the filter wheel, thereby improving light diffusion/light conversion/filtering efficiency for diffuser element (the dynamic diffuser wheel or the static diffuser sheet), the phosphor wheel, and the filter wheel.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector, comprising an illumination system, a light valve and a projection lens,
the illumination system being configured to provide an illumination beam, and comprising a light source and a diffusion element,
the light source being configured to provide an exciting beam;
the diffusion element being located on a transmission path of at least part of the exciting beam, and configured to receive the at least part of the exciting beam for outputting at least part of the illumination beam, wherein the diffusion element comprises at least one first diffusion region and at least one second diffusion region, the at least one second diffusion region surrounds the at least one first diffusion region, and a haze of the at least one first diffusion region is greater than a haze of the at least one second diffusion region;
the light valve being located on a transmission path of the illumination beam from the illumination system, and configured to convert the illumination beam from the illumination system into an image beam; and
the projection lens being located on a transmission path of the image beam,
wherein when the exciting beam is emitted to the diffusion element, the first diffusion region is corresponding to a center region of the exciting beam and the second diffusion region is corresponding to a non-center region of the exciting beam.

2. The projector according to claim 1, wherein the diffusion element has a light incident surface and a light emitting surface opposite to each other, the at least one first diffusion region comprises two first diffusion regions, and the at least one second diffusion region comprises two second diffusion regions, wherein the two first diffusion regions are respectively located on the light incident surface and the light emitting surface and aligned with each other, and wherein the two second diffusion regions are respectively located on the light incident surface and the light emitting surface and aligned with each other.

3. The projector according to claim 1, wherein an optical axis of the illumination beam passes through the at least one first diffusion region.

4. The projector according to claim 1, wherein the haze of the diffusion element is gradually decreased from the at least one first diffusion region to the at least one second diffusion region.

5. The projector according to claim 1, wherein a plurality of first diffusion structures are disposed across the at least one first diffusion region, and a plurality of second diffusion structures are disposed across the at least one second diffusion region, and where in an arrangement density of the first diffusion structures is greater than an arrangement density of the second diffusion structures.

6. The projector according to claim 1, wherein a plurality of first diffusion structures are disposed across the at least one first diffusion region, and a plurality of second diffusion structures are disposed across the at least one second diffusion region, and wherein a size of each of the first diffusion structures is less than a size of each of the second diffusion structures.

7. The projector according to claim 1, wherein the diffusion element is a fixed diffuser sheet.

8. The projector according to claim 1, wherein the diffusion element is a diffuser wheel and is rotatable.

9. An illumination system, comprising:
a light source, configured to provide an exciting beam; and
a diffusion element, located on a transmission path of at least part of the exciting beam, wherein the diffusion element comprises at least one first diffusion region and at least one second diffusion region, the at least one second diffusion region surrounds the at least one first diffusion region, and a haze of the at least one first diffusion region is greater than a haze of the at least one second diffusion region,
wherein when the exciting beam is emitted to the diffusion element, the first diffusion region is corresponding to a center region of the exciting beam and the second diffusion region is corresponding to a non-center region of the exciting beam.

10. The illumination system according to claim 9, wherein the diffusion element has a light incident surface and a light emitting surface opposite to each other, the at least one first diffusion region comprises two first diffusion regions, the at least one second diffusion region comprises two second diffusion regions, the two first diffusion regions are respectively located on the light incident surface and the light emitting surface and aligned with each other, and the two second diffusion regions are respectively located on the light incident surface and the light emitting surface and aligned with each other.

11. The illumination system according to claim 9, wherein an optical axis of the illumination beam provided by the illumination system passes through the at least one first diffusion region.

12. The illumination system according to claim 9, wherein the haze of the diffusion element is gradually decreased from the at least one first diffusion region to the at least one second diffusion region.

13. The illumination system according to claim 9, wherein a plurality of first diffusion structures are disposed across the at least one first diffusion region, and a plurality of second diffusion structures are disposed across the at least one second diffusion region, and wherein an arrangement density of the first diffusion structures is greater than an arrangement density of the second diffusion structures.

14. The illumination system according to claim 9, wherein a plurality of first diffusion structures are disposed across the at least one first diffusion region, and a plurality of second diffusion structures are disposed across the at least one second diffusion region, and wherein a size of each of the first diffusion structures is less than a size of each of the second diffusion structures.

15. The illumination system according to claim 9, wherein the diffusion element is a fixed diffuser sheet.

16. The illumination system according to claim 9, wherein the diffusion element is a diffuser wheel and is rotatable.

17. A diffusion element, comprising:
at least one first diffusion region; and
at least one second diffusion region, surrounding the at least one first diffusion region, wherein a haze of the at least one first diffusion region is greater than a haze of the at least one second diffusion region, wherein when an exciting beam is emitted to the diffusion element, the first diffusion region is corresponding to a center region of the exciting beam and the second diffusion region is corresponding to a non-center region of the exciting beam.

18. The diffusion element according to claim 17, wherein the diffusion element is a fixed diffuser sheet.

19. The diffusion element according to claim 17, wherein the diffusion element is a diffuser wheel and is rotatable.

20. A diffusion element, comprising:
at least one first diffusion region; and
at least one second diffusion region, surrounding the at least one first diffusion region, wherein a haze of the at least one first diffusion region is greater than a haze of the at least one second diffusion region,
wherein the diffusion element has a light incident surface and a light emitting surface opposite to each other, the at least one first diffusion region comprises two first diffusion regions, and the at least one second diffusion region comprises two second diffusion regions, and wherein the two first diffusion regions are respectively located on the light incident surface and the light emitting surface and aligned with each other, and the two second diffusion regions are respectively located on the light incident surface and the light emitting surface and aligned with each other.

21. A diffusion element, comprising:
at least one first diffusion region; and
at least one second diffusion region, surrounding the at least one first diffusion region, wherein a haze of the at least one first diffusion region is greater than a haze of the at least one second diffusion region,
wherein the haze of the diffusion element is gradually decreased from the at least one first diffusion region to the at least one second diffusion region.

22. A diffusion element, comprising:
at least one first diffusion region; and
at least one second diffusion region, surrounding the at least one first diffusion region, wherein a haze of the at least one first diffusion region is greater than a haze of the at least one second diffusion region,
wherein a plurality of first diffusion structures are disposed across the at least one first diffusion region, and a plurality of second diffusion structures are disposed across the at least one second diffusion region, and wherein an arrangement density of the first diffusion structures is greater than an arrangement density of the second diffusion structures.

23. A diffusion element, comprising:
at least one first diffusion region; and
at least one second diffusion region, surrounding the at least one first diffusion region, wherein a haze of the at least one first diffusion region is greater than a haze of the at least one second diffusion region,
wherein a plurality of first diffusion structures are disposed across the at least one first diffusion region, and a plurality of second diffusion structures are disposed across the at least one second diffusion region, and wherein a size of each of the first diffusion structures is less than a size of each of the second diffusion structures.

24. A projector, comprising an illumination system, a light valve and a projection lens,
the illumination system being configured to provide an illumination beam, and comprising a light source and a diffusion element,
the light source being configured to provide an exciting beam;
the diffusion element being located on a transmission path of at least part of the exciting beam and configured to receive the at least part of the exciting beam for outputting at least part of the illumination beam, wherein a plurality of diffusion structures are disposed on the diffusion element and the diffusion element has a light incident surface and a light emitting surface opposite to each other, and wherein the light incident surface comprises at least one first diffusion region and at least one second diffusion region, the at least one second diffusion region of the light incident surface surrounds the at least one first diffusion region of the light incident surface, the light emitting surface comprises at least one first diffusion region and at least one second diffusion region, the at least one second diffusion region of the light emitting surface surrounds the at least one first diffusion region of the light emitting surface, a haze of the at least one first diffusion region is greater than a haze of the at least one second diffusion region, and when the exciting beam is emitted to the diffusion element, the first diffusion region of the light incident surface is corresponding to a center region of the exciting beam and the second diffusion region of the light incident surface is corresponding to a non-center region of the exciting beam;
the light valve being located on a transmission path of the illumination beam from the illumination system, and configured to convert the illumination beam from the illumination system into an image beam; and
the projection lens being located on a transmission path of the image beam.

25. An illumination system, comprising:
a light source, configured to provide an exciting beam; and
a diffusion element, located on a transmission path of at least part of the exciting beam, wherein a plurality of diffusion structures is disposed on the diffusion element, and the diffusion element has a light incident surface and a light emitting surface opposite to each other, and wherein the light incident surface comprises at least one first diffusion region and at least one second diffusion region, the at least one second diffusion region of the light incident surface surrounds the at least one first diffusion region of the light incident surface, the light emitting surface comprises at least one first diffusion region and at least one second diffusion region, the at least one second diffusion region of the light emitting surface surrounds the at least one first diffusion region of the light emitting surface, a haze of the at least one first diffusion region is greater than a haze of the at least one second diffusion region, and when the exciting beam is emitted to the diffusion element, the first diffusion region of the light incident surface is corresponding to a center region of the exciting beam and the second diffusion region of the light incident surface is corresponding to a non-center region of the exciting beam.

26. A diffusion element, comprising:
a plurality of diffusion structures;
a light incident surface; and
a light emitting surface, opposite to the light incident surface, wherein the light incident surface comprises at least one first diffusion region and at least one second diffusion region, the at least one second diffusion region of the light incident surface surrounds the at least one first diffusion region of the light incident surface, the light emitting surface comprises at least one first diffusion region and at least one second diffusion region, the at least one second diffusion region of the light emitting surface surrounds the at least one first diffusion region of the light emitting surface, a haze of the at least one first diffusion region is greater than a haze of the at least one second diffusion region, and when an exciting beam is emitted to the diffusion element, the first diffusion region of the light incident surface is corresponding to a center region of the exciting beam and the second diffusion region of the light incident surface is corresponding to a non-center region of the exciting beam.

* * * * *